Figure 1:
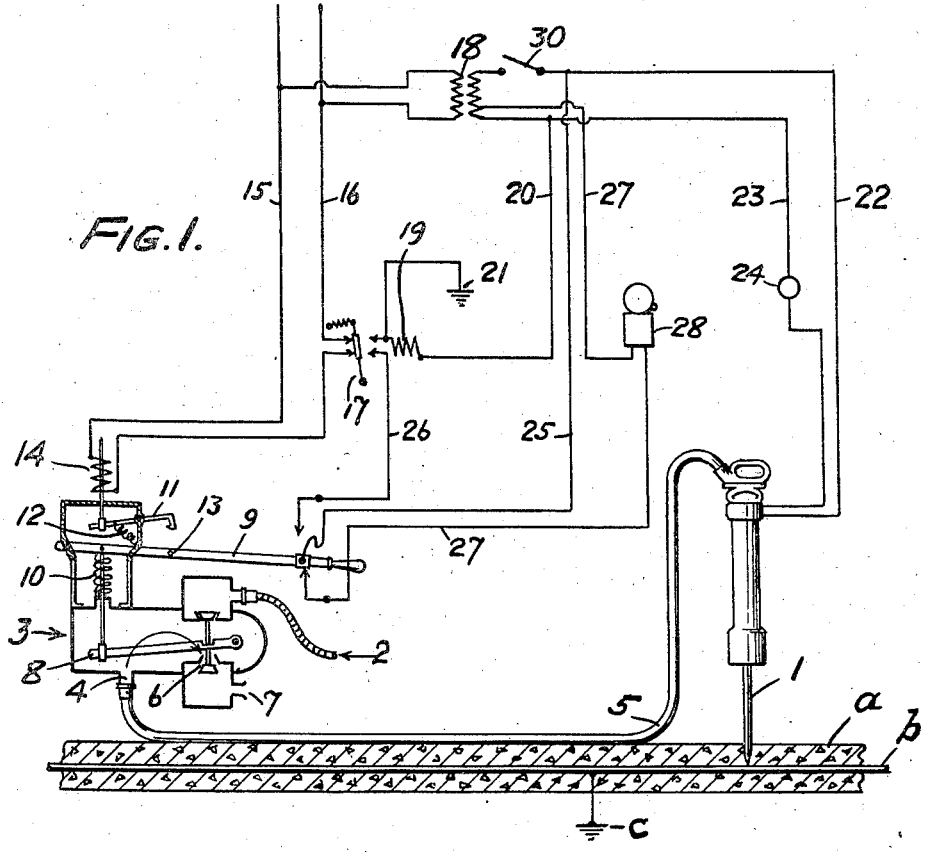

Oct. 15, 1946.  E. F. SHEEHAN ET AL  2,409,397
SAFETY CUTOFF FOR POWER OPERATED HAND TOOLS
Filed Oct. 13, 1943  2 Sheets—Sheet 1

INVENTORS
Edward F. Sheehan &
George V. Hunt
BY
Augustus B. Stoughton
ATTORNEY.

WITNESS:

Patented Oct. 15, 1946

2,409,397

UNITED STATES PATENT OFFICE 2,409,397

SAFETY CUTOFF FOR POWER-OPERATED HAND TOOLS

Edward F. Sheehan and George V. Hunt, Philadelphia, Pa.

Application October 13, 1943, Serial No. 506,089

3 Claims. (Cl. 121—35)

Objects of the present invention are first, to protect workmen and equipment and sub-surface structures when power driven manually guided tools are used for cutting, drilling, breaking or working on relatively non-electrically conducting material in or under or in contact with which relatively high electrically conducting material may be embedded, for example when such tools work on asphalt or other like street pavement in which, or in the foundation of which, or under which high tension metallic sheath cables or pipes carrying water, gas, steam or other fluids, or telephone and other conduits are usually laid or located; second, to automatically cut off the power and stop the operation of the tool as soon as it has penetrated the layer of relatively non-electrically conducting material and has contacted an underlying or adjoining layer of relatively high conducting material; third, to automatically cut off the power and therefore to stop the tool immediately it contacts with relatively high electrically conducting material, for example the metal sheath of a cable and before it contacts with the high tension conductors contained in and insulated from the metallic sheath; fourth, to provide simple, reliable and efficient apparatus for accomplishing the objects indicated as well as the objects and results hereinafter set forth or appearing; fifth, to provide for working a power driven hand guided tool on an intended material in the usual way and for automatically stopping it as soon as it contacts with and before it penetrates another material which it might damage or which might be highly charged with a hazardous medium and cause injury to telephone, water, electric power or other systems or injury to the operator or damage to the tool; sixth, to provide for automatically stopping a pneumatic hand tool working on a street pavement, building floor, or the like, in the event that and as soon as it contacts with and before it penetrates an object such as is likely to be buried in or under the pavement, floor or the like, and which might be damaged by the tool, or itself cause injury to the tool or to the operator; seventh, to provide a supervisory electric circuit for shutting down the tool upon occurrence of the conditions under which it is desired to stop the tool; eighth, to provide for shut-down of the tool in case of failure of electric power to the supervisory electric circuit; ninth, to provide a visual signal to indicate failure of electric power to the supervisory electric circuit; tenth, to provide a seal-in provision in the supervisory electric circuit to cause completion of the tool stopping operation once the shutting-down action of the supervisory circuit is initiated by even momentary occurrence of the condition under which it is desired to stop the tool; and eleventh, to provide an audible signal to indicate that the tool has been shut down by contact with material which is relatively a good electric conductor.

Other objects of the invention will appear from the following description at the end of which the invention will be claimed.

The invention also comprises the improvements to be presently described and finally claimed.

In the following description reference will be made to the accompanying drawings forming part hereof and in which, Figure 1 is a diagrammatic view illustrating an alternating current operated safety cut-off embodying features of the invention and showing or indicating the position of the parts of the valve mechanism when the tool is cut off from the source of power.

Figure 2:
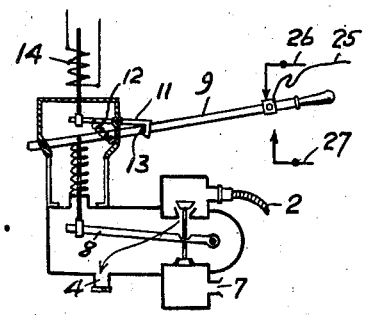
Figure 3:
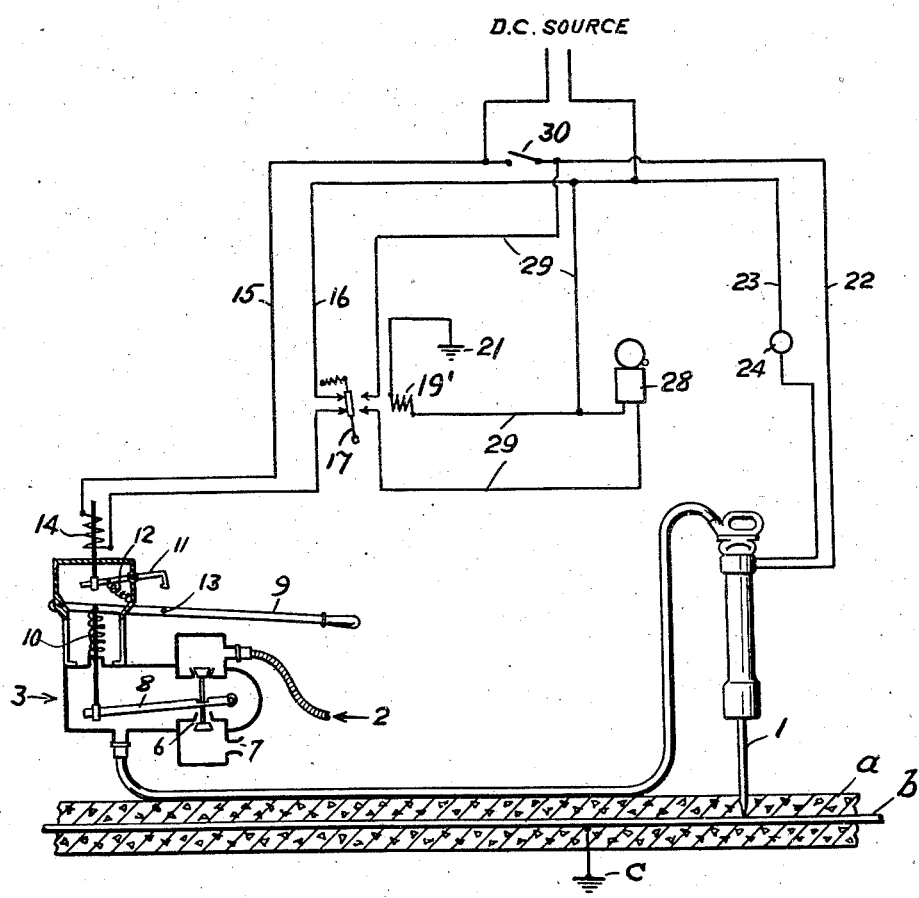

Figure 2 is a similar view showing the position of the parts when the tool is connected with the source of power; and Figure 3 is a view similar to Figure 1 and illustrating the employment of a direct current circuit and omitting certain features shown in Figs. 1 and 2.

Referring to the drawings, 1 indicates a hand-guided power operated tool, specifically a pneumatic tool. 2 indicates a source of power for operating the tool. 3 is a valve housing which includes a valve mechanism having a port 4 for admitting air under pressure to the tool by way of the hose 5. The valve mechanism also includes a port 6 for exhausting air under pressure from the tool by way of the pipe 5 to the atmosphere at 7. The valves of the valve mechanism are operated by the pivotal arm 8 which is shown in Figure 2 in position for operating the tool under power, and in Figure 1 it is shown in position for cutting off the supply of fluid under pressure from the source and for exhausting from the tool and line 5 to the atmosphere so that the tool stops quickly. The pivotal handle 9 is connected by a link with the arm 8 and the spring 10 operates to normally put and hold the valves in the position shown in Figure 1 in which position the tool 1 is at rest. 11 is a pivotal latch normally positioned by the spring 12, as shown in Figure 1, in which position it disengages the handle 9 at 13 when the power is cut off from the tool, and it engages the handle 9 at 13 when the tool is operating under power. The latch 11 is controlled by the solenoid 14 which when energized causes the latch to hold the handle 9 in position, thereby permitting the tool to operate under power. The handle 9 may be shifted to latched position manually or otherwise. The solenoid 14 is shown as included across the leads 15 and 16 of the A. C. source. 17 is a sensitive fast-acting two pole double-throw relay which normally closes the line 16 so that the latch 11 is normally held against the force of its spring 12 in position for engaging the handle 9 and permitting the tool 1 to operate in the ordinary and usual manner. If the position of the two pole double-throw relay be changed toward the right in Figure 1, the circuit through the solenoid will be broken, the spring 12 will release the latch and the tool will stop. The coil 19 serves to shift the position of the two pole double-throw relay 17 appropriately for stopping the tool. There is a lead 20 from one side of the secondary of the transformer 18 through the coil 19 to a relatively low resistance ground at 21. Two leads 22 and 23 extend from the secondary of the transformer to the tool 1 where they may be regarded as connected together and to the tool 1, and in the lead 23 there is a signal lamp 24. At this point in the description it may be said that the tool 1 is for the purposes of description, assumed to be a pneumatic tool and is intended to operate upon or work on material $a$, of relatively low electrical conductivity, for example the asphalt pavement of a street. In the pavement there is likely to be embedded material of relatively high electrical conductivity, such for example as a high tension lead covered cable $b$ grounded for example at $c$. It must, of course, be understood that the foregoing explanation is given by way of description and not by way of limitation, for example, the tool may be operated otherwise than by air, and the material $b$, so long as it is of relatively high electrical conductivity, may be a telephone cable, pipe or the like. and the material $a$ may be the earth beneath the pavement. Resuming the description and assuming the tool to be working in or on the material $a$ of relatively low electrical conductivity, any ground circuit that may exist is of too high resistance to permit the coil 19 to be energized sufficiently to throw the relay 17. However, if the tool contacts the material $b$ of relatively high conductivity, the ground circuit between 21 and $c$ is of relatively low resistance and is of good conductivity and permits of the energization of the coil 19 sufficiently to throw the relay 17 and stop the tool.

Because the contact of the tool 1 with the material $b$, may be momentary or of chattering nature, a sealing-in circuit is provided to prevent the fast-acting relay 17 being deenergized and restored to its normal position before the latch-holding solenoid 14 can function to release the latch 11 and permit the valve to assume the cut-off position. This sealing-in circuit comprises the lead 25 from one side of the secondary circuit of the transformer to the handle 9 and thence through the lead 26, the armature of the relay 17, the coil 19, and the conductor 20, back to the other side of the secondary circuit of the transformer. With the valve mechanism in the tool-operative position illustrated in Fig. 2, the relay 17, when energized and thrown to the right, will remain in that position because the coil 19 will remain energized through the sealing-in circuit regardless of any opening or chattering of the ground circuit through the tool 1 and material $b$. This will allow any time lag which may be required for the solenoid 14 to release latch 11 and permit the handle 9 to take up the tool-stopping position shown in Fig. 1. The parts are so constructed that when the handle 9 has moved far enough to release engagement with the lead 26, the latch 11 will not be able to reengage the latch pin 13.

There is also a lead 27 through the alarm 28 to the contact at the other side of the handle 9 so that when the valve is in position for stopping the tool the circuit is closed through the signal 28 which indicates that the power is cut off from the tool. Obviously, if desired, the sealing-in circuit may be omitted and it is, therefore, not shown in Figure 3. In the latter figure there is a D. C. source but the circuits and translating devices are, as has been described, in connection with Figures 1 and 2. In this case, however, there is a lead 29 from one side of the circuit which branches to and through the coil 19' to ground at 21, and through signal 28 and lead 29 through the two-pole double-throw relay 17 back to the line. The operation of the apparatus shown in Figure 3 is as above described in connection with Figures 1 and 2 except as indicated above. In both Figures 1 and 3, 30 is a blocking switch which is, of course, normally closed.

The operation of the apparatus of Figs. 1 and 2 may be summarized as follows: Under normal conditions the hand tool, driven pneumatically or by other power, with the valve mechanism in the position illustrated in Fig. 2, is operated in the usual manner to disintegrate pavement or other material of relatively high electric resistance $a$. If, however, the pneumatic tool in its normal operation makes contact with underground water pipes, conduits or the like, $b$, an electric circuit is completed from one terminal of the secondary winding of transformer 18 by way of conductor 22 through the tool 1, conducting medium $b$, grounds $c$ and 21, coil 19, and conductor 20 to the other terminal of said winding. Flow of current in this circuit energizes coil 19, throwing relay 17 to the right and energizing the sealing-in circuit to hold the relay in this position despite any chattering of the tool. This energizing of the relay 17 opens the circuit from the electric source to the solenoid 14, thereby permitting the spring 12 to release the latch 11. The spring 10 is then free to move the arm 8 and handle 9 to the tool-stopping position shown in Fig. 1, moving the valve to cut off the air supply and permit the line 5 to exhaust to the atmosphere at 7. This movement of the handle 9 to the position shown in Fig. 1 connects the audible signal 28 to the secondary winding of transformer 18 to direct attention to the occurrence of valve operation. The visual signal 24 is connected to the transformer 18 and when energized indicates (1) that the supervisory electric circuit is energized, and (2) that the flexible electric conductor 22 to the tool is unbroken, it being readily understood that this conductor is subjected to considerable flexure and possible abuse and is therefore likely to break. The apparatus is reset for operation of the tool by merely moving the handle 9 upwardly into the position shown in Fig. 2, the latch 11 automatically engaging with the pin 13. It is obvious, of course, that should failure of the electric source occur, solenoid 14 will be deenergized and the tool will shut down. The supervisory electric circuit of the device shown in Fig. 3 operates in a similar manner from a direct current source, but without the sealing-in feature.

It may be remarked that as a matter of convenience certain of the described working parts may be assembled in a portable housing or case, for example, the valve mechanism, indicated at 3, may be arranged in the case with the handle 9 projecting to the outside, and the blocking switch 30 may be similarly arranged. The signal lamp 24 may be displayed at the outside of the case, and the relay 17 may be arranged inside of the case, and, if desirable, there may be arranged in the case as a D. C. source a storage battery, and the alarm 28 may also be arranged in the case and in that way the invention is applied to street paving and like work in a convenient manner.

It will be obvious to those skilled in the art that modifications may be made in details of construction and arrangement and application in respect to the apparatus chosen for illustration and above described without departing from the spirit of the invention, which is therefore not limited as to such matters or as to matters of mere form or otherwise than the appended claims may require.

We claim:

1. A safety cut-off apparatus comprising in combination a power driven hand tool, power cut-off means having yieldable means normally urging said cut-off means to the cut-off position to stop the tool, a source of electric current, a first electric circuit connected to said source and including an electro-mechanical detent constructed and arranged to restrain said yieldable means from moving said cut-off means to the cut-off position when said detent is energized by said electric current and to release said yieldable means permitting said cut-off means to assume the cut-off position when the electric current to said detent is interrupted, a normally closed relay having its contacts in said first circuit in series with said detent, a second electric circuit connected to said source and including the operating coil of said relay, and means in said second circuit for energizing said relay operating coil responsive to the conditions under which it is desired to stop the tool, whereby the tool will be stopped upon operation of the means for energizing said relay operating coil and also upon the occurrence of any other interruption of the current supply to said first circuit.

2. The invention set forth in claim 1 characterized in that the relay energizing means is provided with a sealing-in circuit for holding said relay in tool stopping position when once in that position and until manually released.

3. The invention set forth in claim 1 characterized in that said apparatus includes an electrically operated visual signal, said signal being connected in series with a part of said tool to said electric source, whereby the operator may be apprised that the circuit to the tool is energized.

EDWARD F. SHEEHAN.
GEORGE V. HUNT.